METHOD OF MAKING HALFTONE REPRODUCTIONS

Filed Oct. 16, 1962

Inventor:
Anton Wilhelm Jemseby
By
[illegible]
Attorney

United States Patent Office 3,300,308
Patented Jan. 24, 1967

3,300,308
METHOD OF MAKING HALFTONE REPRODUCTIONS

Anton Wilhelm Jemseby, 29 Allfarvagen, Taby, Sweden
Filed Oct. 16, 1962, Ser. No. 230,837
3 Claims. (Cl. 96—45)

Figure 1:
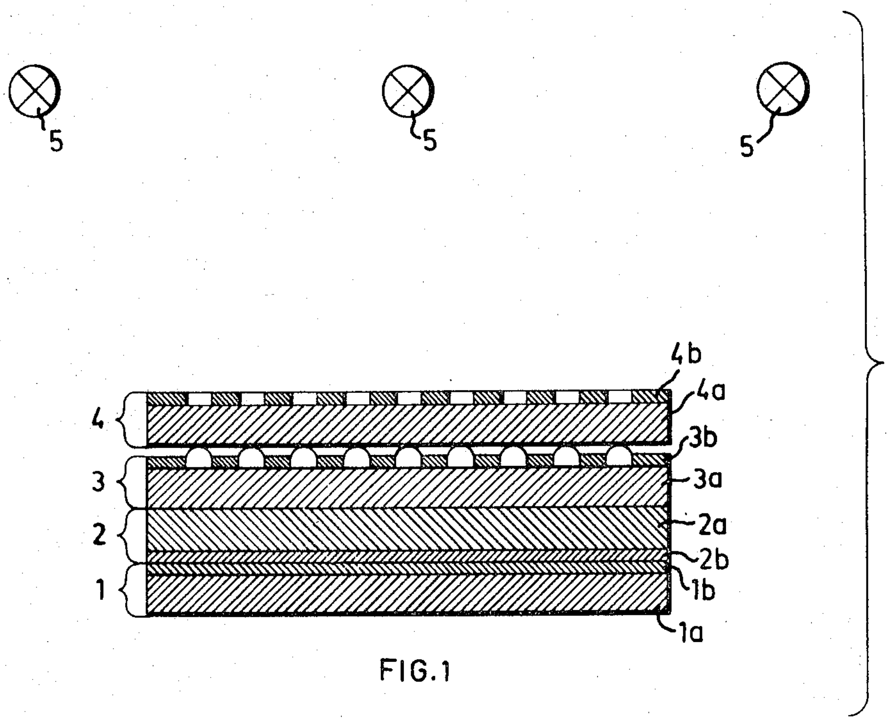

When making halftone reproductions for printing by the ordinary methods it is very difficult to master the brightest tones of the image because halftone dots of very small dimensions are required for these bright tones. The etching of the halftone reproduction for reducing the sizes of the halftone dots cannot be driven past a certain limit, and to obtain still brighter tones a very time-consuming retouch work is required. Nevertheless, etching is a very nervous work, since it may readily happen that the etching is driven too far, making the halftone dots in the brightest portions entirely disappear, so that the halftone reproduction possibly has to be made all over again or subjected to a time-consuming improvement work. If printing is to be made on poor paper, e.g., newspaper printing, the halftone dots cannot be made as small as desired and in newspaper printing one therefore has to be satisfied with the brightest picture portions being entirely devoid of tones or having an abnormally dark tone, for in newspaper printing expensive retouch work is generally not considered worthwhile.

These disadvantages of the prior-art methods are overcome by the present invention. The invention thus relates to a method of making a halftone reproduction in which a photo-sensitive layer is exposed for a certain period of time by screened, image-wise distributed light from an original, is developed and etched. The invention is characterized by exposing the photo-sensitive layer by the light from the original for at least part of the time of exposure through a plurality of screens and for the entire time of exposure through at least one of the screens.

Exposing the photo-sensitive layer at least for part of the time of exposure through a plurality of screens will produce the effect that certain halftone dots become larger than other dots within the brightest portions of the image produced on the photo-sensitive layer. When the image produced is then etched it is easy to master etching away the smallest halftone dots in the brightest portions of the image while leaving the largest dots in these portions. This implies that the screen elements remaining in the halftone reproduction after the etching will be located at a larger spacing within the brightest portions of the halftone than within the dark portions thereof and that the halftone dots in the intermediate tones of the reproduction will have different sizes. This phenomenon is hereinafter termed "screen break-up." This screen break-up cannot normally be observed within the darkest areas of the haltone reproduction because the halftone dots here are very large anyway, but the dots nevertheless have an irregulaly distributed density so that the screen break-up would make itself noticeable at a far-driven etching of the halftone. Such etching, however, is never effected and it is not either desired to attain any screen break-up in the darkest areas of the halftone. The screen break-up will differentiate the brightest tone values of the halftone reproduction thus not only by adjusting the sizes of the halftone dots by way of etching but also by varying the spacings between the screen elements remaining in the brightest areas. As the screen elements in the brightest areas of the halftone are of different sizes before etching the brightest tone values are very easily adjusted by etching as desired without any retouch work and without having nervously to wait for a critical moment in which the etching has to be stopped in order that the halftone reproduction may not be destroyed.

For the application of the invention it is of advantage to employ screens at least one and preferably all of which have non-transparent screen elements the total surface of which is at least half the entire surface of the screen. Although it is possible to employ screens with screen elements distributed at random it is, however, most advantageous to use screens at least one and preferably all of which have screen elements which are regularly distributed over the surface of the screen. The non-transparent screen elements may be lines or dots of customary shapes, arranged in intersecting lines. The different screens may have the same or different spacing and may have the same or different shapes of screen elements. In many cases it is of particular advantage to employ at least one screen having light transmitting dot elements and at least one screen having rhombic, light transmitting screen elements. At the exposure through several screens these screens are adjusted in such a way relative to one another as to produce the least possible moire effect.

At the exposure all screens can be held in the path of light rays all the time, but it has been found that a better result is attained if part of the exposure is effected with only one of the screens kept in the path of light rays. It is therefore preferred to work in such a way as first to make a part exposure through one screen, keeping said screen in position and adding another or two or in exceptional cases several screens and effecting another part exposure. It should be pointed out especially that it is not possible to realize the screen break-up by using but one screen and effecting part exposures and displacing the screen between said part exposures, but several screens must always be kept in the path of light rays during at least part of the time of exposure.

In the method according to the invention, the light of exposure is thrown against the photo-sensitive layer from a plurality of sources of light through the transparency and being screened before its incidence on the photo-sensitive layer. At least one of the screens employed at the screen break-up is a screen which produces on the photo-sensitive layer halftone elements of a density increasing toward the center. If but one such screen is used in the set of screens employed for the application of the invention, this screen should be utilized during the entire time of exposure. As such a screen the invention employs a screen comprising transparent and non-transparent screen elements, the transparent screen elements having a lenticular effect at least within their areas adjoining the non-transparent screen elements. Screens of the latter type are described in my copending application Ser. No. 33,287 filed June 1, 1960, now abandoned. In printing the transparent original is suitably disposed in contact with the photo-sensitive layer, and the screens are placed directly on top of the original or at a small distance from it.

Figure 2:
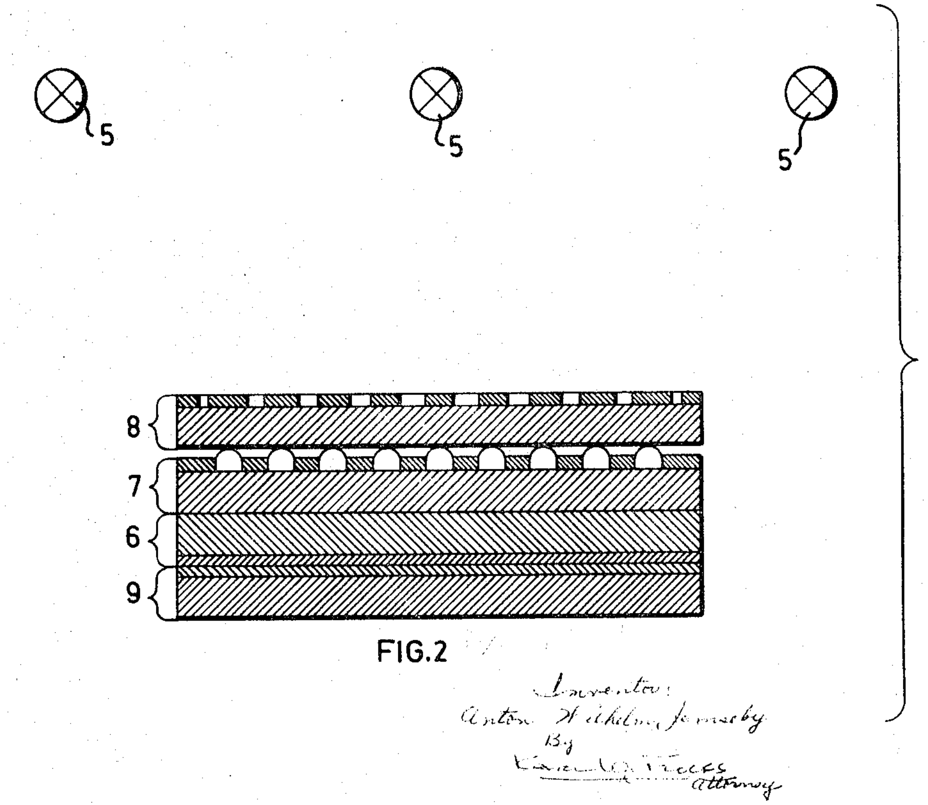

In the accompanying drawing FIGS. 1 and 2 diagrammatically represent two different arrangements for carrying the method according to the invention into effect.

The arrangement shown in FIG. 1 is employed in the method as last outlined in the foregoing. In FIG. 1, 1 denotes the photo-sensitive material which has a base 1*a* and a photo-sensitive layer 1*b*. A continuous tone transparency is designated 2 and comprises a transparent base 2*a* and an exposed and developed image layer 2*b* which is disposed in contact with the photo-sensitive layer 1*b*. 3 denotes a screen of the lenticular type indicated above, having a transparent base 3*a* and a screen layer 3*b* which has transparent lens formations arranged in a screen pattern, and a non-transparent material surrounding the lens formations. The lens formations are spaced from the image layer 2*b* by the thicknesses of the bases 2*a* and 3*a*. Superposed on the screen of lenticular type is an ordinary screen 4 comprising a transparent base 4*a* and a layer 4*b* of alternatingly transparent and non-transparent screen elements. Spaced a considerable distance above the stack of elements 1 to 4 are several electric lamps 5 generating the required printing light which is thus thrown toward the stack of elements 1 to 4 at different angles to the screen 4, is subjected to screen break-up by said screen and penetrates the lenticular screen 3, which subjects the light to a further screen break-up or modifies the screen break-up of said light, passes through the original 2 in the state of such screen break-up, said original image-wise distributing the light subjected to the screen break-up by means of its image layer 2*b*, and finally impinges on the photo-sensitive layer 1*b*. The screen 4 may be removed during part of the time of exposure.

In certain cases an improved effect can be obtained by a modification of the method described, in which modification at least one of the screens is replaced by a transparent halftone reproduction of the transparency 2. This is shown in FIG. 2.

Although this modification may be advantageous with regard to black and white images it is of particular value in the making of a colour separation image corrected in colour at the exposure by means of a colour correction print of the transparency. In this case the colour correction print is made as a transparent halftone print of the transparency and is caused at the exposure of the photo-sensitive layer to modify the light falling from the transparency onto said layer by serving as the transparent halftone print replacing one of the screens. By the screen break-up effect a satisfactory colour correction of the bright areas of the halftone is hereby obtained without any deterioration of the colour correction in the darkest areas of the halftone.

There may be mentioned by way of example the making of a red colour separation final halftone reproduction positive in a three-colour process. Here a blue colour separation halftone positive of the desired image is first made with blue screen position, e.g., in the earlier described manner with the use of a plurality of screens. A lenticular screen film 7 of red screen position is placed on a continuous tone red colour separation negative of the desired image, serving as the original, and the blue halftone positive 8 is placed in exact register to the red negative on top of said lenticular screen film. The entire unit is then placed on the photo-sensitive layer of the photo-sensitive material 9, with the red negative 6 nearest said layer, whereupon printing is effected in the usual manner by means of the lamps 5. Before the printing exposure of the photo-sensitive layer has been terminated the exposure is temporarily interrupted and the blue halftone positive 8 is removed whereafter the exposure is continued until the photo-sensitive layer has been exposed sufficiently. In a corresponding manner colour separation prints can be made for the other colours in the three-colour process or in other multi-colour processes, and it is possible to use the same or different screen positions and the same or different screen spacing and dot shape of the screens for the colour correction print and the screen employed in connection therewith.

What I claim and desire to secure by Letters Patent is:

1. A method of making a halftone reproduction for printing, comprising the steps of exposing a photosensitive layer by light impinging on said layer at different angles and emerging from a plurality of spaced light source means for a certain total period of time, with a transparency superposed on said layer between said layer and said light source means, screening said light for at least part of said total period of time through a plurality of superposed screen means between said transparency and said light source means having opaque and light transmitting screen elements with at least one screen means having light transmitting screen elements with a lenticular effect at least within their areas adjoining the opaque screen elements, screening said light for all of said total period of time through at least one of said screen means, removing all of said screen means and said transparency from said photosensitive exposed layer, and developing said exposed layer after removal of said screen means and said transparency for obtaining on said layer a visually distinct halftone image in which the halftone dots are of different sizes in a specific highlight area corresponding to a specific tone value of said transparency.

2. A method according to claim 1, further characterized by the step of etching said developed layer to remove the halftone dots having the smallest size.

3. A method according to claim 1, wherein said screen means through which said light is screened for all of said total period of time is said screen means having light transmitting screen elements with a lenticular effect at least within their areas adjoining the opaque screen elements.

References Cited by the Examiner

UNITED STATES PATENTS

| | | | |
|---|---|---|---|
| 2,151,301 | 3/1939 | Percy et al. | 96—40 |
| 2,203,651 | 6/1940 | Capstaff | 96—26 |
| 2,279,825 | 4/1942 | Kaszab | 88—1 |
| 2,304,988 | 12/1942 | Yule | 96—45 |
| 2,343,586 | 3/1944 | Schufftan | 96—45 |
| 2,596,115 | 5/1952 | Austin | 96—45 |
| 2,767,093 | 10/1956 | Bilhoefer | 96—45 |
| 2,914,407 | 11/1959 | Meyer | 96—40 |
| 3,085,878 | 4/1963 | Archer | 96—118 |

FOREIGN PATENTS

| | | |
|---|---|---|
| 175,792 | 8/1953 | Austria. |

NORMAN G. TORCHIN, *Primary Examiner.*

A. LIBERMAN, D. PRICE, *Assistant Examiners.*